United States Patent
Huang et al.

(10) Patent No.: US 11,760,412 B2
(45) Date of Patent: Sep. 19, 2023

(54) SYSTEMS AND METHODS FOR CONTROLLING A VEHICLE LOCALIZATION ROUTINE

(71) Applicant: DENSO CORPORATION, Aichi (JP)

(72) Inventors: Minglei Huang, Novi, MI (US); Prasanna Sivakumar, Pittsburgh, PA (US)

(73) Assignee: DENSO CORPORATION, Kariya (JP)

( * ) Notice: Subject to any disclaimer, the term of this patent is extended or adjusted under 35 U.S.C. 154(b) by 21 days.

(21) Appl. No.: 17/708,751

(22) Filed: Mar. 30, 2022

(65) Prior Publication Data

US 2023/0116386 A1    Apr. 13, 2023

Related U.S. Application Data

(60) Provisional application No. 63/262,212, filed on Oct. 7, 2021.

(51) Int. Cl.
*B62D 6/02* (2006.01)
*G01S 7/48* (2006.01)
*B62D 15/02* (2006.01)

(52) U.S. Cl.
CPC .............. *B62D 6/02* (2013.01); *B62D 15/021* (2013.01); *G01S 7/4802* (2013.01)

(58) Field of Classification Search
CPC ............ B62D 6/02; B62D 15/021; G01S 7/48
See application file for complete search history.

(56) References Cited

U.S. PATENT DOCUMENTS

2013/0150717 A1\*  6/2013  Sato ...................... A61B 8/466
                                                          600/443
2021/0302583 A1\*  9/2021  Agrawal ................ G06N 3/044

FOREIGN PATENT DOCUMENTS

WO    WO-2018055449 A2 \*  3/2018 ........... B60Q 1/0023

\* cited by examiner

*Primary Examiner* — Tan Q Nguyen
(74) *Attorney, Agent, or Firm* — Harness, Dickey & Pierce, P.L.C.

(57) ABSTRACT

A method includes obtaining steering data of the vehicle from one or more steering sensors, determining whether the vehicle is operating in one of a turning state and a non-turning state based on the steering data, performing a localization routine based on a first echo set of the 3D data points from among the plurality of 3D data points when the vehicle is operating in the turning state, and performing the localization routine based on a second echo set of the 3D data points from among the plurality of 3D data points when the vehicle is operating in the non-turning state, where a number of the plurality of 3D data points of the first echo set is greater than a number of the plurality of 3D data points of the second echo set.

20 Claims, 5 Drawing Sheets

FIG. 6

SYSTEMS AND METHODS FOR CONTROLLING A VEHICLE LOCALIZATION ROUTINE

CROSS-REFERENCE TO RELATED APPLICATION

This application is a U.S. patent application, which claims priority to, and the benefit of U.S. Provisional Patent Application No. 63/262,212 filed on Oct. 7, 2021. The disclosure of the above applications is incorporated herein by reference.

FIELD

The present disclosure relates to systems and methods for controlling a vehicle localization routine.

BACKGROUND

The statements in this section merely provide background information related to the present disclosure and may not constitute prior art.

Autonomous and semi-autonomous vehicles use light detection and ranging (lidar) sensors to obtain three-dimensional (3D) data points representing objects in an environment surrounding the vehicle and to perform localization routines, such as a driver assistance routine, an adaptive cruise control routine, a braking routine, and/or an object detection routine. However, the localization routines often require the vehicle to utilize a significant amount of computing resources to process and interpret the 3D data points to accurately perform the localization routines.

SUMMARY

This section provides a general summary of the disclosure and is not a comprehensive disclosure of its full scope or all of its features.

The present disclosure provides a method for controlling a localization routine performed by a vehicle, where the localization routine is based on a plurality of three-dimensional (3D) data points obtained from a lidar sensor of the vehicle. The method includes obtaining steering data of the vehicle from one or more steering sensors, determining whether the vehicle is operating in one of a turning state and a non-turning state based on the steering data, performing a localization routine based on a first echo set of the 3D data points from among the plurality of 3D data points when the vehicle is operating in the turning state, and performing the localization routine based on a second echo set of the 3D data points from among the plurality of 3D data points when the vehicle is operating in the non-turning state, where a number of the plurality of 3D data points of the first echo set is greater than a number of the plurality of 3D data points of the second echo set.

In one form, the method further includes generating a plurality of echo groups based on a timestamp value associated with each 3D data point from among the plurality of 3D data points and assigning the plurality of echo groups to one of the first echo set and the second echo set based on the timestamp value associated with the plurality of echo groups. In one form, the plurality of echo groups includes a first echo group, a second echo group, and a third echo group, the first echo set includes the first echo group and the second echo group, and the second echo set includes the third echo group. In one form, the plurality of echo groups includes a first echo group, a second echo group, and a third echo group, the first echo set includes the first echo group and one or more 3D data points from among the second echo group, and the second echo set includes one or more remaining 3D data points from among the second echo group. In one form, the one or more steering sensors include a steering angle sensor, a steering wheel position sensor, or a combination thereof.

In one form, determining whether the vehicle is operating in one of the turning state and the non-turning state based on the steering data further comprises determining a steering angle of the vehicle based on the steering data obtained from the steering angle sensor and determining the vehicle is operating in the turning state when the steering angle of the vehicle is one of less than a left steering angle threshold value and greater than a right steering angle threshold value. The method includes determining the vehicle is operating in the non-turning state when the steering angle of the vehicle is one of greater than the left steering angle threshold value and less than the right steering angle threshold value. In one form, determining whether the vehicle is operating in one of the turning state and the non-turning state based on the steering data comprises determining a steering wheel angle of the vehicle based on the steering data obtained from the steering wheel position sensor and determining the vehicle is operating in the turning state when the steering wheel angle of the vehicle is one of greater than a left steering wheel angle threshold value and greater than a right steering wheel angle threshold value. The method includes determining the vehicle is operating in the non-turning state when the steering wheel angle of the vehicle is one of less than the left steering wheel angle threshold value and less than the right steering wheel angle threshold value.

In one form, the method includes determining whether the vehicle is operating in one of the turning state and the non-turning state based on speed data obtained from one or more speed sensors of the vehicle. In one form, determining whether the vehicle is operating in one of the turning state and the non-turning state based on the steering data and the speed data further comprises determining a speed of the vehicle based on the speed data obtained from the one or more speed sensors, determining a steering angle of the vehicle based on the steering data obtained from the steering angle sensor, determining the vehicle is operating in the turning state when the speed is less than a threshold speed and the steering angle of the vehicle is one of less than a left steering angle threshold value and greater than a right steering angle threshold value, and determining the vehicle is operating in the non-turning state when the speed is greater than the threshold speed and the steering angle of the vehicle is one of greater than the left steering angle threshold value and less than the right steering angle threshold value.

In one form, determining whether the vehicle is operating in one of the turning state and the non-turning state based on the steering data and the speed data further comprises determining a speed of the vehicle based on the speed data obtained from the one or more speed sensors, determining a steering wheel angle of the vehicle based on the steering data obtained from the steering wheel position sensor, determining the vehicle is operating in the turning state when the speed is less than a threshold speed and the steering wheel angle of the vehicle is one of greater than a left steering wheel angle threshold value and greater than a right steering wheel angle threshold value, and determining the vehicle is operating in the non-turning state when the speed is greater than the threshold speed and the steering wheel angle of the vehicle is one of less than the left steering wheel angle threshold value and less than the right steering wheel angle threshold value.

The present disclosure provides a system for controlling a localization routine performed by a vehicle, where the localization routine is based on a plurality of three-dimensional (3D) data points obtained from a lidar sensor of the vehicle. The system includes one or more processors and one or more nontransitory computer-readable mediums storing instructions that are executable by the one or more processors. The instructions include obtaining steering data of the vehicle from one or more steering sensors, determining whether the vehicle is operating in one of a turning state and a non-turning state based on the steering data, and generating a plurality of echo groups based on a timestamp value associated with each 3D data point from among the plurality of 3D data points. The instructions include assigning the plurality of echo groups to one of a first echo set and a second echo set based on the timestamp value associated with the plurality of echo groups, performing a localization routine based on the first echo set when the vehicle is operating in the turning state, and performing the localization routine based on the second echo set when the vehicle is operating in the non-turning state, where a number of the plurality of 3D data points of the first echo set is greater than a number of the plurality of 3D data points of the second echo set.

The present disclosure provides a method for controlling a localization routine performed by a vehicle, where the localization routine is based on a plurality of three-dimensional (3D) data points obtained from a lidar sensor of the vehicle. The method includes obtaining steering data of the vehicle from one or more steering sensors and speed data of the vehicle from a speed sensor, determining whether the vehicle is operating in one of a turning state and a non-turning state based on the steering data and the speed data, and generating a plurality of echo groups based on a timestamp value associated with each 3D data point from among the plurality of 3D data points. The method includes assigning the plurality of echo groups to one of a first echo set and a second echo set based on the timestamp value associated with the plurality of echo groups, performing a localization routine based on the first echo set when the vehicle is operating in the turning state, and performing the localization routine based on the second echo set when the vehicle is operating in the non-turning state, where a number of the plurality of 3D data points of the first echo set is greater than a number of the plurality of 3D data points of the second echo set.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides systems and methods for controlling a localization routine performed by a vehicle. A controller obtains steering data and determines whether the vehicle is in one of a turning state and a non-turning state based on the steering data. The controller performs a localization routine based on a first echo set of the 3D data points from among the plurality of 3D data points when the vehicle is operating in the turning state and based on a second echo set of the 3D data points from among the plurality of 3D data points when the vehicle is operating in the non-turning state, where a number of the first echo set of 3D data points is greater than a number of the second echo set of 3D data points. Accordingly, the controller performs the localization routines with enhanced resolution (i.e., a relatively higher amount of 3D data points) and improved accuracy when the vehicle is performing a turning maneuver or the like. Furthermore, the controller performs the localization routines with reduced computing resources and 3D data points corresponding to the edges of detected objects when the vehicle is not performing a turning maneuver.

Figure 1:
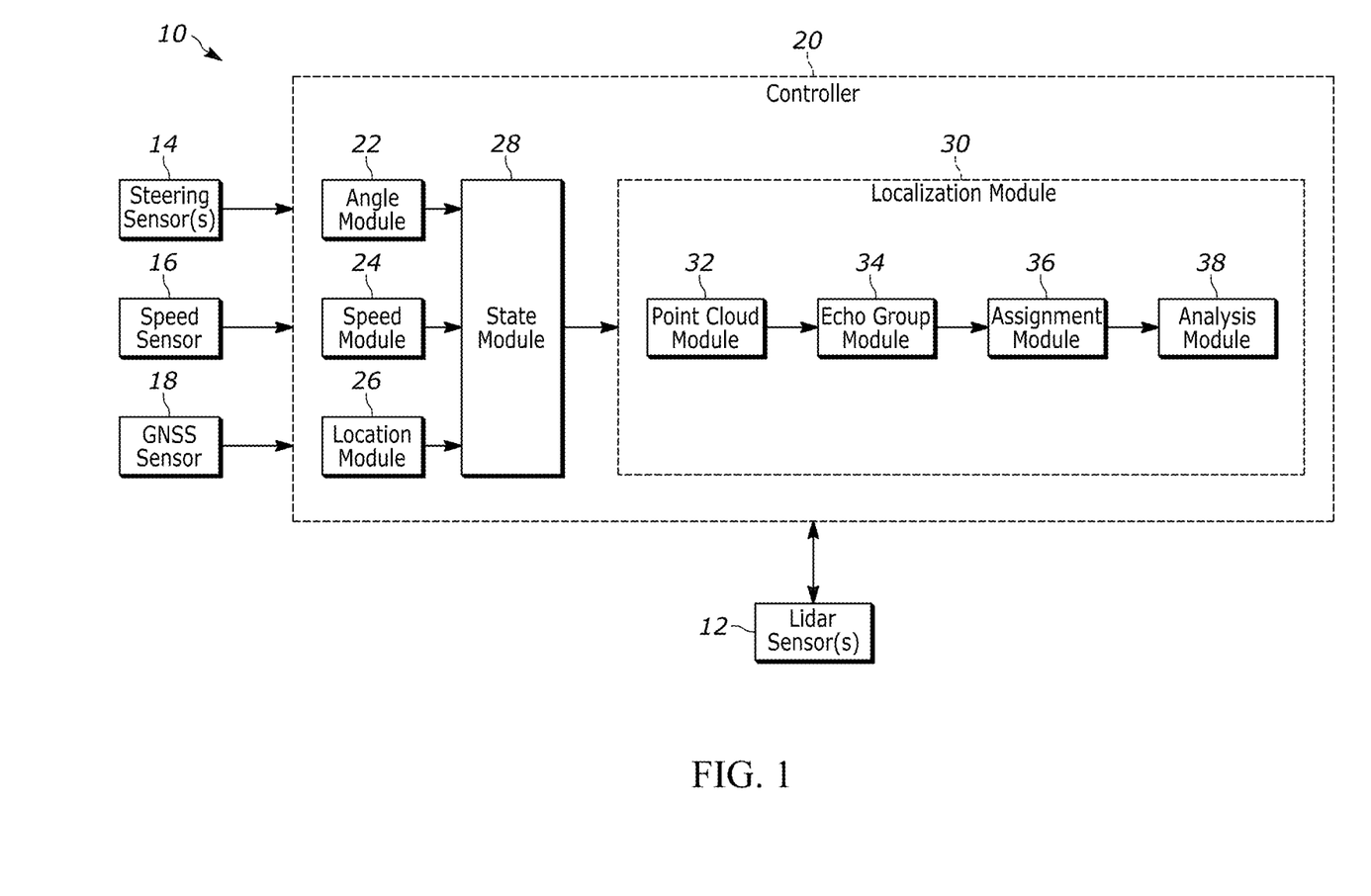
FIG. 1 is a functional block diagram of a vehicle in accordance with the teachings of the present disclosure.

Referring to FIG. 1, a vehicle 10 is shown and generally includes one or more light detection and ranging (lidar) sensors 12, one or more steering sensors 14, a speed sensor 16, a global navigation satellite system (GNSS) sensor 18, and a controller 20. In one form, the components of the vehicle 10 are communicably coupled by a vehicle communication network, such as a controlled area network (CAN), a local interconnect network (LIN), and/or other suitable communication networks.

In one form, the one or more lidar sensors 12 detect contours and ranges of various objects of an environment surrounding the vehicle 10, such as traffic infrastructure, obstructions, pedestrians, other vehicles, among other objects surrounding the vehicle 10. Specifically, each of the one or more lidar sensors 12 includes a laser system that emits a laser, a photodetector system that obtains various reflection metrics associated with one or more reflected signals associated with the objects in the surrounding environment, such as a timestamp associated with the reflected signals, a light intensity value that is based on a luminosity of the environment surrounding the vehicle 10, and a surface reflectance value that is based on a signal strength of the reflected signals. In one form, the one or more lidar sensors 12 are provided by a single photon avalanche diode (SPAD)-based lidar sensor.

In one form, the one or more steering sensors 14 obtain steering data of the vehicle 10 and may include a steering angle sensor and/or a steering wheel position sensor. In one form, the speed sensor 16 obtains vehicle speed data of the vehicle 10 and may be provided by conventional speed sensors. In one form, the GNSS sensor 18 obtains location data of the vehicle 10 and may be provided by conventional GNSS sensors (e.g., a global positioning system (GPS) sensor). As described below in further detail, the controller 20 is configured to determine whether the vehicle 10 is in one of a turning state and a non-turning state based on the steering data, the speed data, and/or the location data.

In one form, the controller 20 includes an angle module 22, a speed module 24, a location module 26, a state module 28, and a localization module 30. In order to execute the functionality described herein, the controller 20 may include one or more processor circuits that execute machine-readable instructions stored in a nontransitory computer-readable medium, such as a read-only memory (ROM) circuit and/or a random-access memory (RAM) circuit.

In one form, the angle module 22 determines a steering angle of the vehicle 10 based on the steering data obtained from the one or more steering sensors 14. As an example and referring to FIGS. 1 and 2A-2B, when the one or more steering sensors 14 are provided by a steering angle sensor, the angle module 22 determines a steering angle of the vehicle 10. As used herein, the "steering angle of the vehicle 10" refers to an angle of vectors 70-1, 70-2 of wheels 40-1, 40-2, respectively, relative to a respective nominal centerline 60-1, 60-2 of the wheels 40-1, 40-2, where the vectors 70-1, 70-2 originate at a center point/centroid of the wheels 40-1, 40-2 and project towards a front end of the vehicle 10 (as indicated by arrow 50).

Figure 2A:
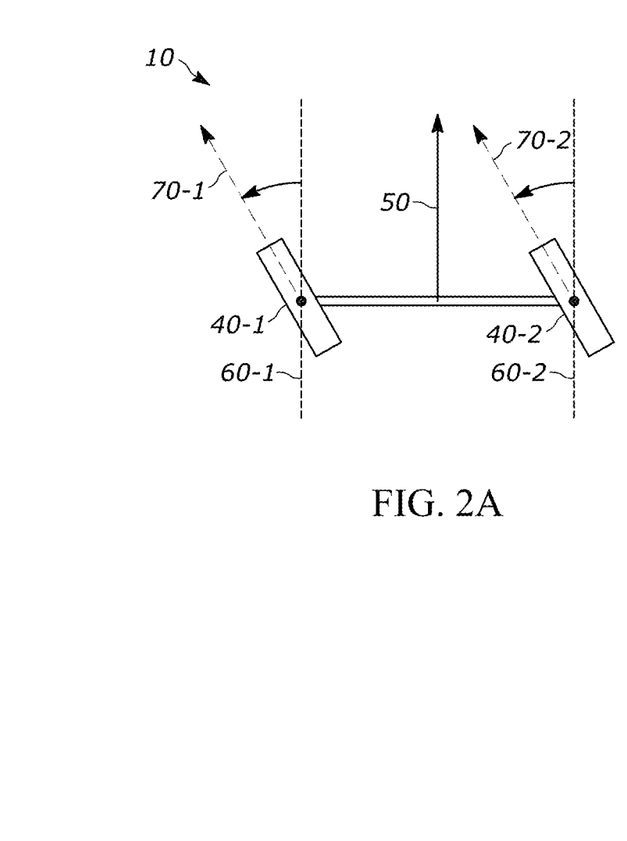
FIG. 2A illustrates a steering angle of the vehicle in accordance with the teachings of the present disclosure.
Figure 2B:
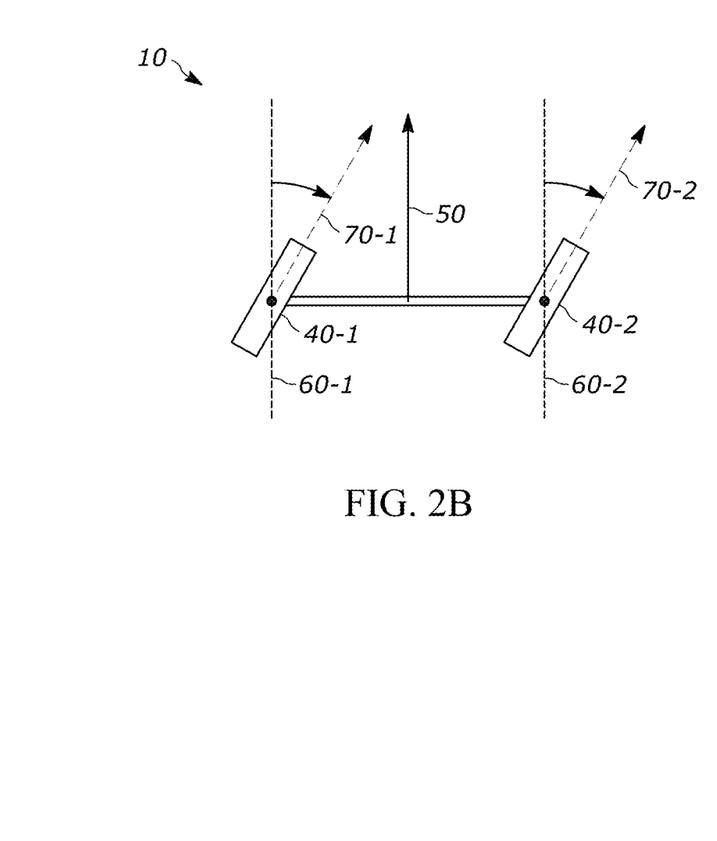
FIG. 2B illustrates another steering angle of the vehicle in accordance with the teachings of the present disclosure.

In one form and as shown in FIG. 2A, the angle module 22 may determine that the steering angle of the vehicle 10 is less than zero when a front edge of the wheels 40-1, 40-2 are positioned to the left of the centerlines 60-1, 60-2. Additionally and as shown in FIG. 2B, the angle module 22 may determine that the steering angle of the vehicle 10 is greater than zero when the front edge of the wheels 40-1, 40-2 are positioned to the right of the centerlines 60-1, 60-2. It should be understood that the steering angle of the vehicle 10 may be measured using various other notations and/or representations and is not limited to the examples described herein (e.g., the steering angle of the vehicle 10 may be represented as an angle magnitude relative to the centerlines 60-1, 60-2).

Figure 3:
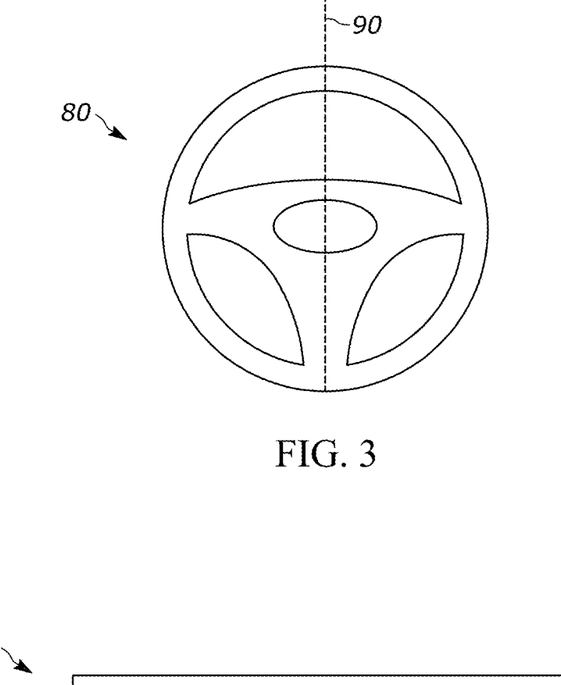
FIG. 3 illustrates a steering wheel angle in accordance with the teachings of the present disclosure.

As another example and referring to FIGS. 1 and 3, when the one or more steering sensors 14 are provided by a steering wheel position sensor, the angle module 22 determines a steering wheel angle of the vehicle 10. As used herein, the "steering wheel angle" refers to a magnitude of an angle of vector of steering wheel 80 of the vehicle 10 relative to a nominal centerline 90 of the steering wheel 80, where the vector originates at a center point of the steering wheel 80 and project towards an edge of the steering wheel 80. It should be understood that the steering angle of the vehicle 10 may be measured using various other notations and/or representations and is not limited to the examples described herein.

In one form, the speed module 24 is configured to determine a speed of the vehicle 10 based on the speed data obtained from the speed sensor 16. In one form, the location module 26 determines a location of the vehicle 10 based on the GNSS data obtained from the GNSS sensor 18 and/or correlates the location to predefined roadway features of a map of the controller 20, such as an intersection, a highway, a boulevard, among other roadway features.

In one form, the state module 28 determines whether the vehicle 10 is operating in one of a turning state and a non-turning state based on the steering data. As used herein, "turning state" refers to the vehicle 10 performing or intending to perform a turning maneuver, such as a left-hand turn or a right-hand turn. As used herein, "non-turning state" refers to the vehicle 10 not operating in the turning state.

As an example, the state module 28 determines the vehicle 10 is operating in the turning state when the steering angle of the vehicle 10 is less than a left steering angle threshold value (i.e., a value of a steering angle of the vehicle 10 that corresponds to the vehicle 10 making a left-hand turn) or greater than a right steering angle threshold value (i.e., a value of a steering angle of the vehicle 10 that corresponds to the vehicle 10 making a right-hand turn). Furthermore, the state module 28 may determine the vehicle 10 is operating in the non-turning state when the steering angle of the vehicle 10 is greater than the left steering angle threshold value or less than the right steering angle threshold value.

As another example, the state module 28 determines the vehicle 10 is operating in the turning state when the steering wheel angle is greater than a left steering wheel angle threshold value (i.e., a magnitude of the steering wheel angle that corresponds to the vehicle 10 making a left-hand turn) or greater than a right steering wheel angle threshold value (i.e., magnitude of the steering wheel angle that corresponds to the vehicle 10 making a right-hand turn). Furthermore, the state module 28 may determine the vehicle 10 is operating in the non-turning state when the steering wheel angle of the vehicle 10 is less than one of the left steering wheel angle threshold value and the right steering wheel angle threshold value.

In one form, the state module 28 determines the vehicle 10 is operating in one of the turning state and the non-turning state based on the steering data and at least one of the speed data and the location data. As an example, the state module 28 determines the vehicle 10 is operating in the turning state when the steering angle indicates the vehicle 10 is making a left-hand or right-hand turn and when the vehicle speed is less than a threshold vehicle speed. As an additional example, the state module 28 determines the vehicle 10 is operating in the non-turning state when the steering angle indicates the vehicle 10 is not making a left-hand or right-hand turn and/or when the vehicle speed is greater than a threshold vehicle speed. As yet another example, the state module 28 determines the vehicle 10 is operating in the turning state when the steering angle indicates the vehicle 10 is making a left-hand or right-hand turn and when the location of the vehicle 10 corresponds to an intersection.

Figure 4:
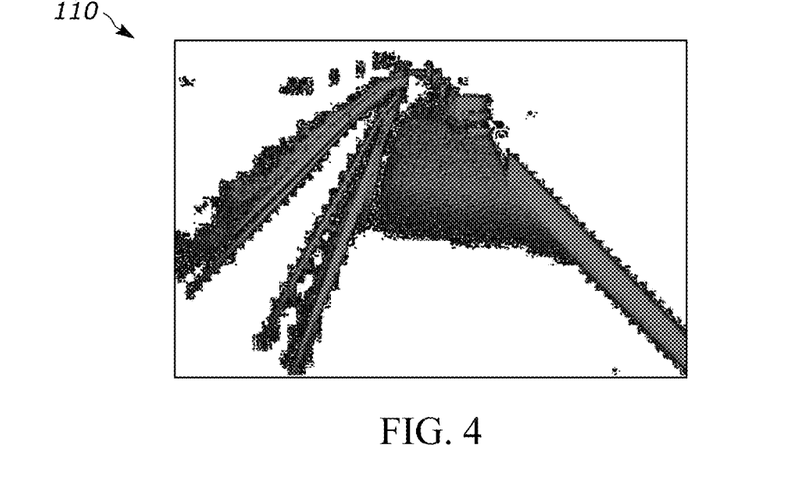
FIG. 4 illustrates a plurality of three-dimensional data points generated by a lidar sensor in accordance with the teachings of the present disclosure.

In one form, the localization module 30 includes a point cloud module 32, an echo group module 34, an assignment module 36, and an analysis module 38. In one form, the point cloud module 32 generates a plurality of three-dimensional (3D) data points representing the detected contours and ranges of the objects of the environment surrounding the vehicle 10 based on the reflection metrics (e.g., the timestamps, light intensity values, and surface reflectance values) using known lidar data point generation routines. As an example and as shown in FIG. 4, the point cloud module 32 is configured to generate a plurality of 3D data points 110 representing the contours and ranges of various objects surrounding the vehicle 10.

In one form, the echo group module 34 generates a plurality of echo groups based on the plurality of 3D data points 110. As used herein, "echo group" refers to a set of 3D data points 110 having the same (or approximately the same) timestamp value (e.g., the time difference of arrival values are equal). In one form, each echo group is associated with a unique timestamp value (i.e., each 3D data point 110 of a first echo group has a first timestamp value, each 3D data point 110 of a second echo group has a second timestamp value, and so on). In one form, the light intensity and/or surface reflectance values of the 3D data points 110 of a given echo group may be equal or unequal. As an example and referring to FIGS. 1 and 5A, the echo group module 34 may generate a first echo group 120-1 representing a set of 3D data points 110 associated with a first timestamp value, a second echo group 120-2 representing a set of 3D data points 110 associated with a second timestamp value, and a third echo group 120-3 representing a set of 3D data points 110 associated with a third timestamp value. In one form, the first timestamp value is less than the second timestamp value, and the second timestamp value is less than the third timestamp value. The first, second, and third echo groups 120-1, 120-2, 120-3 are collectively referred to hereinafter as the "echo groups 120."

In one form, the assignment module 36 assigns the echo groups to one of a first echo set and a second echo set based on the timestamp values associated with the echo groups. In one form, the first echo set includes the echo group having the lowest timestamp value (e.g., the first echo group 120-1), and the second echo set includes the echo group having the highest timestamp value (e.g., the third echo group 120-3).

In one form, the assignment module 36 assigns the echo group(s) having a timestamp value that are neither the highest nor the lowest (e.g., the second echo group 120-2) to one of the first and second echo sets such that the number of 3D data points 110 of the first echo set is greater than the number of 3D data points 110 of the second echo set. As an example, the assignment module 36 assigns each of the echo group(s) having a timestamp value that is neither the highest nor the lowest to the first echo set such that the number of 3D data points 110 of the first echo set is greater than the number of 3D data points 110 of the second echo set.

As another example, the assignment module 36 assigns the echo group(s) having a timestamp value that are neither the highest nor the lowest to the first and second echo sets such that the number of 3D data points 110 of the first echo set is greater than the number of 3D data points 110 of the second echo set. That is, the assignment module 36 assigns one or more 3D data points 110 from the echo group(s) having a timestamp value that are neither the highest nor the lowest to the first echo set and the remaining one or more 3D data points 110 from the given echo groups to the second echo set such that the number of 3D data points 110 of the first echo set is greater than the number of 3D data points 110 of the second echo set.

Figure 5A:
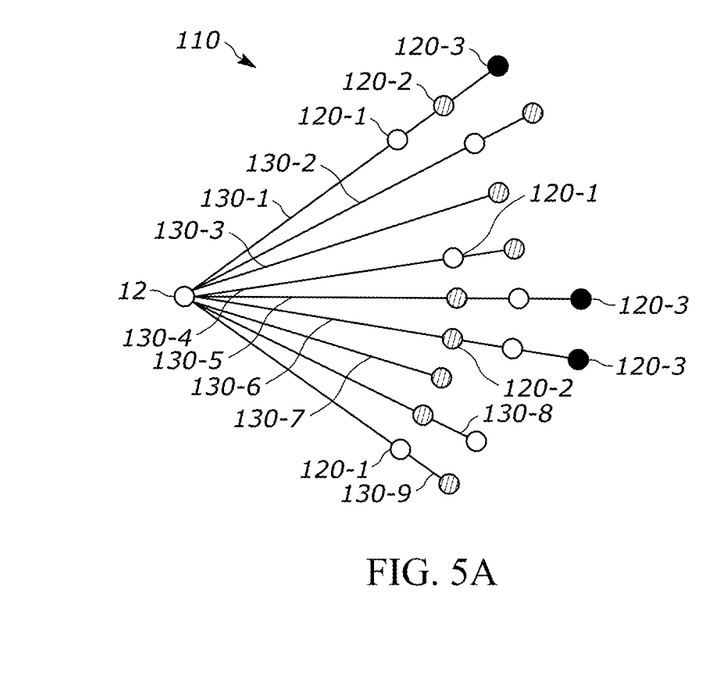
FIG. 5A illustrates a plurality of echo groups in accordance with the teachings of the present disclosure.

As a specific example and referring to FIGS. 1 and 5A, the assignment module 36 assigns the first echo group 120-1 and one or more additional echo groups 120 (e.g., the second echo group 120-2) to a first echo set, and the assignment module 36 assigns the remaining echo groups (e.g., the third echo group 120-3) to a second echo set such that the number of 3D data points 110 of the second echo set is less than the number of 3D data points 110 of the first echo set.

In one form, the assignment module 36 assigns the echo groups to one of the first and second echo sets based on an echo group reassignment routine. As an example and referring to FIGS. 1 and 5A-5B, the assignment module 36 correlates laser beams 130-1, 130-2, 130-3, 130-4, 130-5, 130-6, 130-7, 130-8, 130-9 (collectively referred to hereinafter as "laser beams 130") emitted by the one or more lidar sensors 12 to the resulting 3D data points 110 and identified echo groups 120.

Figure 5B:
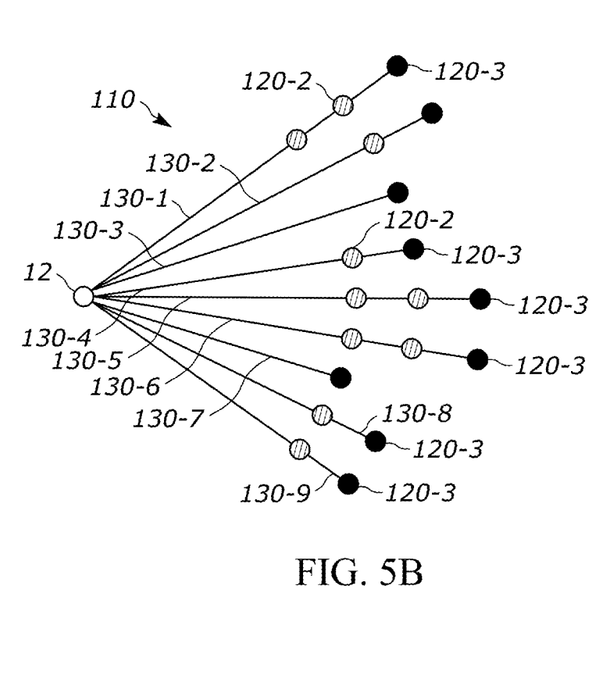
FIG. 5B illustrates a plurality of echo groups that are subjected to an echo group reassignment routine in accordance with the teachings of the present disclosure.

Subsequently, for each of the laser beams 130, the assignment module 36 determines a number of 3D data points 110 and selectively reassigns the echo groups of the 3D data points 110 based on the number of 3D data points 110. As an example, if the laser beam 130 is associated with one 3D data point 110 (e.g., the laser beams 130-3, 130-7), the assignment module 36 selectively reassigns the 3D data point 110 to the echo group associated with the lowest timestamp value. That is, the assignment module 36 reassigns the 3D data point 110 to the first echo group 120-1 if the 3D data point 110 was originally assigned to the second or third echo groups 120-2, 120-3 by the echo group module 34.

As another example, if the laser beam 130 is associated with two 3D data points 110 (e.g., the laser beams 130-2, 130-4, 130-8, 130-9), the assignment module 36 selectively reassigns the 3D data point 110 having the lower timestamp value to the echo group associated with the lowest timestamp value. That is, the assignment module 36 reassigns the 3D data point having the lower timestamp value to the first echo group 120-1 if the 3D data point 110 was originally assigned to the second or third echo groups 120-2, 120-3 by the echo group module 34. Furthermore, the assignment module 36 selectively reassigns the 3D data point 110 having the higher timestamp value to the echo group associated with the highest timestamp value. That is, the assignment module 36 reassigns the 3D data point 110 having the higher timestamp value to the third echo group 120-3 if the 3D data point 110 was originally assigned to the first or second echo groups 120-1, 120-2 by the echo group module 34.

As an additional example, if the laser beam 130 is associated with three or more 3D data points 110 (e.g., the laser beams 130-1, 130-5, 130-6), the assignment module 36 selectively reassigns the 3D data point 110 having the lowest timestamp value to the echo group associated with the lowest timestamp value. That is, the assignment module 36 reassigns the 3D data point 110 having the lower timestamp value to the first echo group 120-1 if the 3D data point 110 was originally assigned to the second or third echo groups 120-2, 120-3 by the echo group module 34. Furthermore, the assignment module 36 selectively reassigns the remaining 3D data points 110 to the echo group associated with the highest timestamp value. That is, the assignment module 36 reassigns the remaining 3D data points 110 to the third echo group 120-3 if the 3D data points 110 were originally assigned to the first or second echo groups 120-1, 120-2 by the echo group module 34.

In one form, the analysis module 38 performs a localization routine (e.g., known driver assistance routines, adaptive cruise control routines, braking routines, and/or an object detection routines) based on the vehicle state and one of the first and second echo sets. As an example, the analysis module 38 performs the localization routine based on the first echo set when the vehicle 10 is operating in the turning state, and the analysis module 38 performs the localization routine based on the second echo set when the vehicle 10 is operating in the non-turning state. Accordingly, the analysis module 38 can perform the localization routines with enhanced resolution (i.e., a relatively higher amount of 3D data points) and improved accuracy when the vehicle 10 is performing a turning maneuver or the like. Furthermore, the analysis module 38 can perform the localization routines with reduced computing resources and 3D data points 110 corresponding to the edges of detected objects when the vehicle 10 is not performing a turning maneuver.

Figure 6:
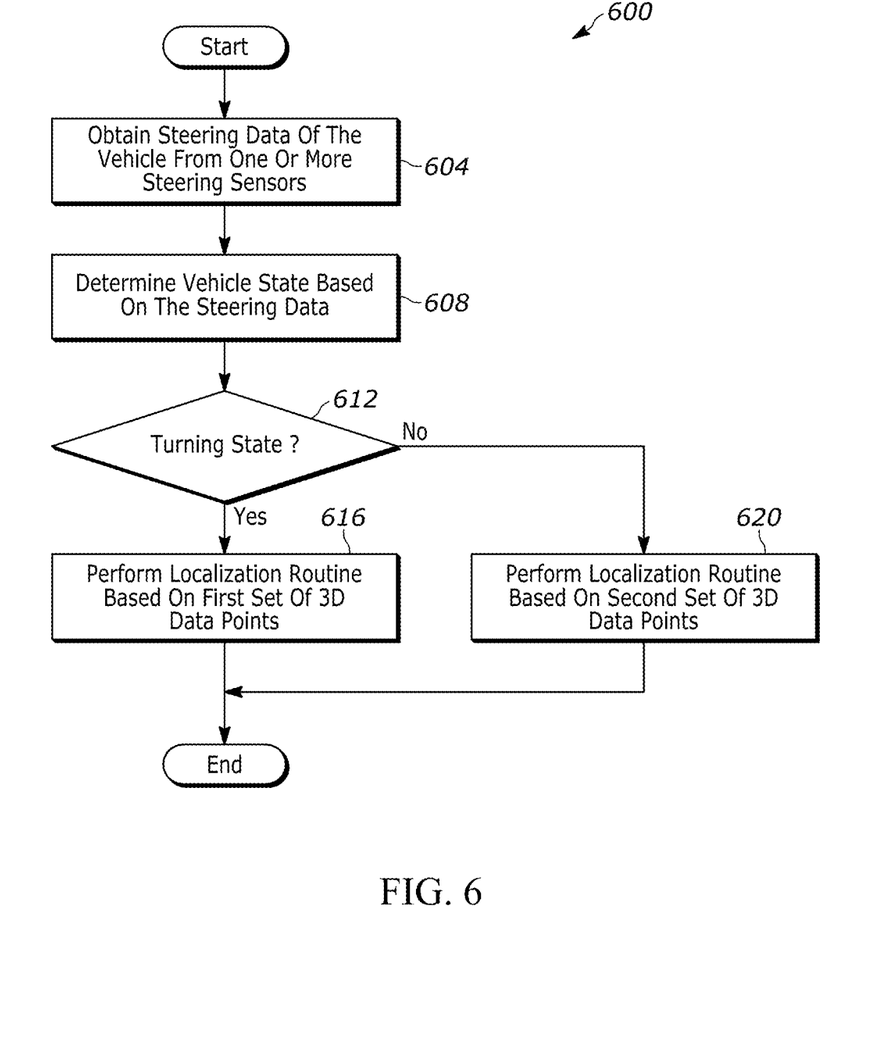
FIG. 6 is a flowchart of an example control routine in accordance with the teachings of the present disclosure.

Referring to FIG. 6, a flowchart illustrating a routine 600 for controlling a localization routine performed by the vehicle 10 is shown. At 604, the controller 20 obtains steering data of the vehicle 10 from the one or more steering sensors 14. At 608, the controller 20 determines the vehicle state (i.e., the turning state or the non-turning state) based on the operating data. As described above, the controller 20 may also determine the vehicle state based on the steering data and at least one of the speed data and the location data. At 612, the controller 20 determines whether the vehicle 10 is in the turning state. If so, the routine 600 proceeds to 616, where the controller 20 performs the localization routine based on the first echo set of 3D data points 110. If the controller 20 determines the vehicle 10 is in the non-turning state at 612, the routine 600 proceeds to 620, where the controller 20 performs the localization routine based on the second echo set of 3D data points 110.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for controlling a localization routine performed by a vehicle, wherein the localization routine is based on a plurality of three-dimensional (3D) data points obtained from a lidar sensor of the vehicle, the method comprising:
   obtaining steering data of the vehicle from one or more steering sensors;
   determining whether the vehicle is operating in one of a turning state and a non-turning state based on the steering data;
   performing a localization routine based on a first echo set of the 3D data points from among the plurality of 3D data points when the vehicle is operating in the turning state; and
   performing the localization routine based on a second echo set of the 3D data points from among the plurality of 3D data points when the vehicle is operating in the non-turning state, wherein a number of the plurality of 3D data points of the first echo set is greater than a number of the plurality of 3D data points of the second echo set.

2. The method of claim 1 further comprising:
   generating a plurality of echo groups based on a timestamp value associated with each 3D data point from among the plurality of 3D data points; and
   assigning the plurality of echo groups to one of the first echo set and the second echo set based on the timestamp value associated with the plurality of echo groups.

3. The method of claim 2, wherein:
   the plurality of echo groups includes a first echo group, a second echo group, and a third echo group;
   the first echo set includes the first echo group and the second echo group; and
   the second echo set includes the third echo group.

4. The method of claim 2, wherein:
   the plurality of echo groups includes a first echo group, a second echo group, and a third echo group;
   the first echo set includes the first echo group and one or more 3D data points from among the second echo group; and
   the second echo set includes one or more remaining 3D data points from among the second echo group.

5. The method of claim 1, wherein the one or more steering sensors include a steering angle sensor, a steering wheel position sensor, or a combination thereof.

6. The method of claim 5, wherein determining whether the vehicle is operating in one of the turning state and the non-turning state based on the steering data further comprises:
   determining a steering angle of the vehicle based on the steering data obtained from the steering angle sensor;

determining the vehicle is operating in the turning state when the steering angle of the vehicle is one of:
- less than a left steering angle threshold value; and
- greater than a right steering angle threshold value; and determining the vehicle is operating in the non-turning state when the steering angle of the vehicle is one of:
- greater than the left steering angle threshold value; and
- less than the right steering angle threshold value.

7. The method of claim 5, wherein determining whether the vehicle is operating in one of the turning state and the non-turning state based on the steering data comprises:
- determining a steering wheel angle of the vehicle based on the steering data obtained from the steering wheel position sensor;
- determining the vehicle is operating in the turning state when the steering wheel angle of the vehicle is one of:
  - greater than a left steering wheel angle threshold value; and
  - greater than a right steering wheel angle threshold value; and
- determining the vehicle is operating in the non-turning state when the steering wheel angle of the vehicle is one of:
  - less than the left steering wheel angle threshold value; and
  - less than the right steering wheel angle threshold value.

8. The method of claim 5 further comprising determining whether the vehicle is operating in one of the turning state and the non-turning state based on speed data obtained from one or more speed sensors of the vehicle.

9. The method of claim 8, wherein determining whether the vehicle is operating in one of the turning state and the non-turning state based on the steering data and the speed data further comprises:
- determining a speed of the vehicle based on the speed data obtained from the one or more speed sensors;
- determining a steering angle of the vehicle based on the steering data obtained from the steering angle sensor;
- determining the vehicle is operating in the turning state when the speed is less than a threshold speed and the steering angle of the vehicle is one of:
  - less than a left steering angle threshold value; and
  - greater than a right steering angle threshold value; and
- determining the vehicle is operating in the non-turning state when the speed is greater than the threshold speed and the steering angle of the vehicle is one of:
  - greater than the left steering angle threshold value; and
  - less than the right steering angle threshold value.

10. The method of claim 8, wherein determining whether the vehicle is operating in one of the turning state and the non-turning state based on the steering data and the speed data further comprises:
- determining a speed of the vehicle based on the speed data obtained from the one or more speed sensors;
- determining a steering wheel angle of the vehicle based on the steering data obtained from the steering wheel position sensor;
- determining the vehicle is operating in the turning state when the speed is less than a threshold speed and the steering wheel angle of the vehicle is one of:
  - greater than a left steering wheel angle threshold value; and
  - greater than a right steering wheel angle threshold value; and
- determining the vehicle is operating in the non-turning state when the speed is greater than the threshold speed and the steering wheel angle of the vehicle is one of:
  - less than the left steering wheel angle threshold value; and
  - less than the right steering wheel angle threshold value.

11. A system for controlling a localization routine performed by a vehicle, wherein the localization routine is based on a plurality of three-dimensional (3D) data points obtained from a lidar sensor of the vehicle, the system comprising:
- one or more processors and one or more nontransitory computer-readable mediums storing instructions that are executable by the one or more processors, wherein the instructions comprise:
  - obtaining steering data of the vehicle from one or more steering sensors;
  - determining whether the vehicle is operating in one of a turning state and a non-turning state based on the steering data;
  - generating a plurality of echo groups based on a timestamp value associated with each 3D data point from among the plurality of 3D data points;
  - assigning the plurality of echo groups to one of a first echo set and a second echo set based on the timestamp value associated with the plurality of echo groups;
  - performing a localization routine based on the first echo set when the vehicle is operating in the turning state; and
  - performing the localization routine based on the second echo set when the vehicle is operating in the non-turning state, wherein a number of the plurality of 3D data points of the first echo set is greater than a number of the plurality of 3D data points of the second echo set.

12. The system of claim 11, wherein:
- the plurality of echo groups includes a first echo group, a second echo group, and a third echo group;
- the first echo set includes the first echo group and the second echo group; and
- the second echo set includes the third echo group.

13. The system of claim 11, wherein:
- the plurality of echo groups includes a first echo group, a second echo group, and a third echo group;
- the first echo set includes the first echo group and one or more 3D data points from among the second echo group; and
- the second echo set includes one or more remaining 3D data points from among the second echo group.

14. The system of claim 11, wherein the one or more steering sensors include a steering angle sensor, a steering wheel position sensor, or a combination thereof.

15. The system of claim 14, wherein the instructions for determining whether the vehicle is operating in one of the turning state and the non-turning state based on the steering data further comprise:
- determining a steering angle of the vehicle based on the steering data obtained from the steering angle sensor;
- determining the vehicle is operating in the turning state when the steering angle of the vehicle is one of:
  - less than a left steering angle threshold value; and
  - greater than a right steering angle threshold value; and
- determining the vehicle is operating in the non-turning state when the steering angle of the vehicle is one of:
  - greater than the left steering angle threshold value; and
  - less than the right steering angle threshold value.

16. The system of claim 14, wherein the instructions for determining whether the vehicle is operating in one of the turning state and the non-turning state based on the steering data comprise:
  determining a steering wheel angle of the vehicle based on the steering data obtained from the steering wheel position sensor;
  determining the vehicle is operating in the turning state when the steering wheel angle of the vehicle is one of:
    greater than a left steering wheel angle threshold value; and
    greater than a right steering wheel angle threshold value; and
  determining the vehicle is operating in the non-turning state when the steering wheel angle of the vehicle is one of:
    less than the left steering wheel angle threshold value; and
    less than the right steering wheel angle threshold value.

17. A method for controlling a localization routine performed by a vehicle, wherein the localization routine is based on a plurality of three-dimensional (3D) data points obtained from a lidar sensor of the vehicle, the method comprising:
  obtaining steering data of the vehicle from one or more steering sensors and speed data of the vehicle from a speed sensor;
  determining whether the vehicle is operating in one of a turning state and a non-turning state based on the steering data and the speed data;
  generating a plurality of echo groups based on a timestamp value associated with each 3D data point from among the plurality of 3D data points;
  assigning the plurality of echo groups to one of a first echo set and a second echo set based on the timestamp value associated with the plurality of echo groups;
  performing a localization routine based on the first echo set when the vehicle is operating in the turning state; and
  performing the localization routine based on the second echo set when the vehicle is operating in the non-turning state, wherein a number of the plurality of 3D data points of the first echo set is greater than a number of the plurality of 3D data points of the second echo set.

18. The method of claim 17, wherein:
  the plurality of echo groups includes a first echo group, a second echo group, and a third echo group;
  the first echo set includes the first echo group and the second echo group; and
  the second echo set includes the third echo group.

19. The method of claim 17, wherein:
  the plurality of echo groups includes a first echo group, a second echo group, and a third echo group;
  the first echo set includes the first echo group and one or more 3D data points from among the second echo group; and
  the second echo set includes one or more remaining 3D data points from among the second echo group.

20. The method of claim 17, wherein the one or more steering sensors include a steering angle sensor, a steering wheel position sensor, or a combination thereof.

\* \* \* \* \*